Nov. 17, 1953  A. C. EAVES  2,659,161
FEED PRESERVATION
Filed April 16, 1949
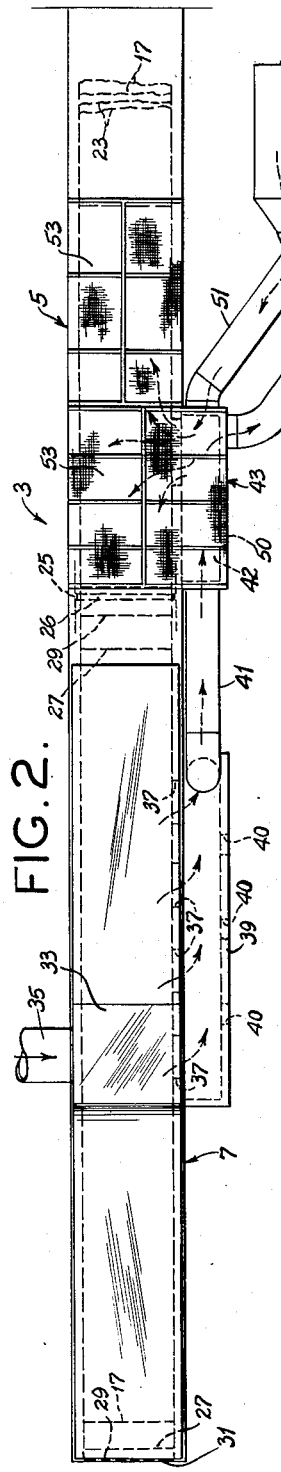
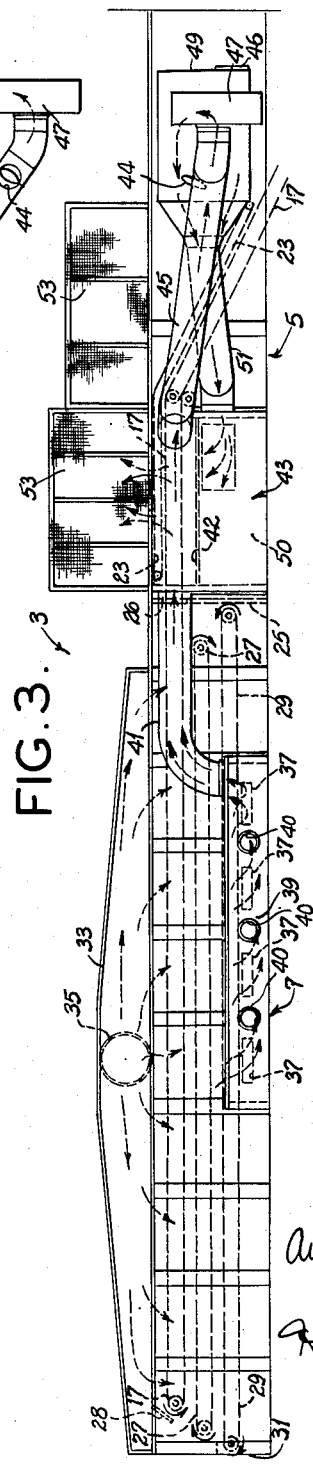
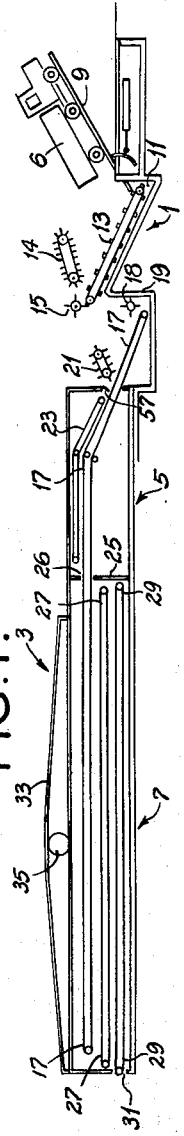
Ausie Calaway Eaves
Inventor
Haynes and Koenig
Attorneys

UNITED STATES PATENT OFFICE 2,659,161

FEED PRESERVATION

Ausie Calaway Eaves, Brawley, Calif., assignor to Ralston Purina Company, St. Louis, Mo., a corporation of Missouri Application April 16, 1949, Serial No. 87,933

7 Claims. (Cl. 34—31)

This invention relates to feed preservation and more particularly to the preservation of alfalfa.

Briefly, the present invention comprises methods for treating alfalfa to preserve the carotene content thereof by first exposing alfalfa to a flow of heated air and thereafter exposing said alfalfa to a further flow of heated air directed oppositely to said first air flow. This invention also includes methods for treating alfalfa which comprises exposing alfalfa to a flow of air heated to a temperature of at least approximately 180° F., the specific humidity of which is not greater than that of saturated air at 158° F. The invention further comprises apparatus suitable for carrying out the above specified methods.

Among the several objects of this invention are the provision of apparatus for the preservation of feed, which dehydrates alfalfa with a minimum loss of carotene at a high production rate; the provision of methods of dehydrating feeds which produce dehydrated products at low cost with a minimum loss of carotene; the provision of methods of preserving feed which produce dehydrated feed of high and uniform quality which retains a large proportion of its original carotene content; and, the provision of apparatus of the class described which is rugged in construction and simple and efficient in operation. Other objects will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawing, in which one of various possible embodiments of the invention is illustrated, Fig. 1 is a diagrammatic representation of the dehydration apparatus of the present invention;

Fig. 2 is a plan view of one embodiment of the dehydration apparatus of the present invention; and, Fig. 3 is a front elevation view of the apparatus of Fig. 2, with parts broken away.

Similar reference characters indicate corresponding parts throughout the several views of the drawing.

The use of dried alfalfa both as an animal and poultry feed and as a basic ingredient in many animal feeds has long been established as being beneficial to animal health. However, the full food values of freshly cut alfalfa have not been retained in the dried product. This is primarily due to diminution of the carotene content of the alfalfa during drying and storage. This loss may be due to the deleterious effects of oxidation, sunlight, enzymatic action, and high temperatures, as well as other conditions which may adversely affect carotene. The carotene content of alfalfa decreases from the time it is cut until it is fed to the animal in its final dehydrated form and the longer the storage period the greater is the loss, under usual conditions.

It has been found in accordance with the present invention that excessive diminution of carotene can be avoided and dried alfalfa can be produced which possesses a large proportion of the carotene originally present and which will retain high percentages of the original carotene content even after extensive periods of storage. The alfalfa either freshly cut or after a period of sun drying is subjected to a flow of air heated to a temperature of at least 180° F. and thereafter is exposed to a second flow of heated air directed against the partially dried alfalfa in a direction opposite to that of the initial air flow. The temperature of the heated air stream directed against the freshly cut alfalfa is maintained above 180° F., but below that which would scorch or burn the alfalfa. The specific humidity is maintained below the value at which air becomes saturated at 158° F. Novel apparatus has also been devised which operates to efficiently expose the alfalfa to heated air and automatically and continuously transfer such partially dried alfalfa to a low temperature dehydration section. Operation of this apparatus in accordance with the methods hereinafter described insures high capacity production of dehydrated alfalfa at minimum cost and with minimum loss in carotene content.

Referring now more particularly to Fig. 1 of the drawing, there is indicated generally at numeral 1 a feeding section of a two zone dehydrator 3. Dehydrator 3 comprises a primary zone 5 and a secondary zone 7 which operate co-operatively to continuously dehydrate a forage crop unloaded into section 1. The feeding section 1 includes a tilting hydraulic platform 9 for intermittently dumping loads of alfalfa or the like into an unloading pit 11, and a continuously moving endless belt feeder 13 which operates to elevate the feed and move it toward primary zone 1. Mounted above feeder 13 is a top rake 14 and a spiked kicker 15 which serve to maintain a substantially constant flow of alfalfa to a continuously moving endless mat 17 which begins in a second pit 19. Mat 17 traverses the entire length of both zones 5 and 7 of the dehydrator 3 and has mounted above it a second kicker 18, an adjustable leveling rake 21, and an adjustable hold-down mat 23.

Mat 23 is mounted above and contiguous to mat 17 and extends through substantially the entire length of primary zone 5. A baffle 25 separates zone 5 from zone 7. Baffle 25 has an aperture 26 of sufficient size to pass only mat 17 and the alfalfa layer carried thereon. Mat 17 terminates at the end of zone 7 and there drops partially dehydrated alfalfa onto the surface of an intermediate mat 27 mounted below and contiguous mat 17. A swinging baffle 28 prevents air from passing over the left end of mat 17 without passing through the alfalfa layer thereon. Mat 27 is driven so as to move in the opposite direction to mat 17 so as to deposit alfalfa at a later stage of dehydration on the top surface of a lower mat 29, which is mounted below and parallel mat 27 and which moves the alfalfa again in the same direction as mat 17 and discharges fully dehydrated alfalfa through a discharge opening 31. Mats 17, 23, 27 and 29 are formed of perforate or foraminous material such as woven wire of 1/4" to 3/8" mesh.

Referring now more particularly to Figs. 2 and 3 the construction of the dehydrator unit 1 is shown in more detail together with the air circulation therethrough. Mounted on top of and extending over substantially the entire zone 7 is an input manifold 33 having an inlet duct 35 which is connected to any conventional source (not shown) of hot dry air. Manifold 33 may include various baffles adapted to deflect the incoming air into paths which insure relatively even passage of the air downwardly through all portions of mat 17 within zone 7. Several outlet apertures 37 are formed in the lower side wall of zone 7 and serve as communication between the interior of zone 7 and an exhaust manifold 39. The path of the air through zone 7 is substantially vertically downward through all three mats 17, 27 and 29 as indicated in Fig. 3. Additional baffles may also be interposed between the mats to insure vertical flow of the air.

Moist, cooled air is exhausted from manifold 39 through ports 40 to the atmosphere and through a duct 41 to the top section 42 of a secondary manifold 43. Thus, a portion of the exhaust air from zone 7 is vented to the atmosphere and the balance is passed through duct 41 to the top section 42 of secondary manifold 43. A duct 45 interconnects manifold section 42 to a blower fan 47. Fan 47 feeds a furnace unit 49 which in turn is interconnected to zone 5 through the bottom section 50 of secondary manifold 43 and a duct 51. The reheated air leaving furnace 49 comprises a portion of the exhaust air stream from zone 7, a quantity of fresh air which is admitted through an aperture 44 in duct 45, and the products of combustion from furnace 49 which include fresh air drawn into the furnace through an aperture 46 for purposes of combustion. This reheated air is then passed upwardly through mat 17 and the alfalfa carried thereon so as to heat and partially dry the alfalfa passing through zone 5. The air is thereafter exhausted through a screen covered outlet 53. Baffles may be mounted within zone 5 to insure substantially even flow of the heated air upwardly through all portions of mat 17 within zone 5.

A swinging baffle 57 is mounted above mat 17 as it enters zone 5 so as to prevent leakage of air from zone 5 other than through outlet 53.

Operation is as follows:

A truck 6 loaded with freshly cut or partially sun dried alfalfa is driven on the platform 9 which is then tilted to dump the alfalfa into pit 11 wherein it is elevated by belt 13. Top rake 14, is driven in a counterclockwise direction so as to insure a continuous alfalfa layer of predetermined thickness being fed into pit 19. Kicker 15 rotates in a clockwise direction and serves to fluff the alfalfa as it falls into pit 19. Kicker 18 also rotates clockwise and further insures proper and even dispersal of the alfalfa upon belt 17. Belt 17 is thus continuously and evenly loaded with alfalfa which is fed in a layer upwardly into zone 5. Leveling rake 21 rotates counterclockwise and is adjusted to give a layer of alfalfa of desired thickness. Hold down mat 23 is also adjustable to any desired height above mat 17 and serves to prevent alfalfa fragments from being blown upward and out of the zone 5. The mat speeds may be conveniently varied in accordance with ambient temperatures and the condition of the alfalfa.

The alfalfa then is carried through aperture 26 into zone 7 where it is exposed to the downwardly directed flow of hot dry air from manifold 33. At the left end of mat 17 the partially dehydrated alfalfa tumbles onto the surface of mat 27 which moves it to the right toward baffle 25. At the end of mat 27 the alfalfa gravitates to the surface of mat 29 where it is moved to the exit 31 and thereafter discharged for further processing, such as grinding and packaging.

The air which enters zone 7 through manifold 33 picks up sufficient quantities of water to insure that the alfalfa leaving zone 7 is dehydrated to such an extent that it has a water content less than approximately 10% and preferably approximately only 5–7%. The air during its passage through zone 7 has been cooled and picks up moisture. A portion of this air is then passed through duct 41 to fan 47 and then reheated by furnace 49 and fed into zone 5 through secondary manifold 43. The balance of the effluent air from zone 7 is vented to the atmosphere through ports 40. The reheated air is forced upwardly through the alfalfa layer travelling through zone 5. This layer is held between mat 17 and hold down mat 23; the latter moves at the same rate of speed and in the same direction as mat 17. The reheated air after passing through the alfalfa layer in zone 5 is discharged to the atmosphere through outlet 53.

The following examples are illustrative only.

*Example 1*

Cut alfalfa was fed onto mat 17 and relatively dry air was fed into manifold 33 at a temperature of about 350° F. Approximately 3/4 of the effluent air from exhaust manifold 39 was vented directly to the atmosphere through ports 40 and the remaining 1/4 was reheated by furnace 49 to a temperature of approximately 350° F. The moisture content of this reheated air was maintained below approximately 1.8% relative humidity at 350° F.

Dehydrated alfalfa was produced at the rate of 5.8 tons per hour. The carotene content of the alfalfa at exit 31 was found to be 341 p. p. m. The initial carotene content of the chopped alfalfa was found to be 372 p. p. m. Thus, the dehydration of the alfalfa was accomplished with a carotene retention of 91.8%.

*Example 2*

Example 1 was repeated with alfalfa having a carotene content of approximately 341 p. p. m. at the beginning of mat 17. The carotene content of the dehydrated alfalfa was 314 p. p. m., giving a carotene retention of 92.1%.

*Example 3*

Example 1 was repeated with alfalfa having a carotene content of approximately 322 p. p. m. at the beginning of mat 17. The carotene content of the dehydrated alfalfa was 311 p. p. m., giving a carotene retention of 96.6%.

*Example 4*

Example 1 was repeated with alfalfa having a carotene content of approximately 351 p. p. m. at the beginning of mat 17. The carotene content of the dehydrated alfalfa was 329 p. p. m., giving a carotene retention of 93.2%.

It is to be understood that the thickness of the layers and the rate of movement through zones 5 and 7 may be varied considerably depending on ambient temperature and humidity conditions and upon the initial moisture content of the chopped alfalfa. Similarly the temperatures of the air flowing through zone 5 and zone 7 may be varied from the values given.

It is also to be noted that proportions of air from zone 7, other than ¼, may be reheated and fed into zone 5. In fact, air from an exterior source may be used exclusively rather than preheating portions of effluent air from zone 5, as long as the temperatures and moisture content are properly controlled. Under preferred operating conditions approximately ⅓ of the total moisture is eliminated in zone 5 and the average temperature of the alfalfa layer entering zone 7 is approximately 125° F. The temperature of the alfalfa layer entering zone 7 from zone 5 is maintained between limits of between approximately 100° F. and approximately 158° F. The specific humidity of the input air to zone 5 must be maintained below that of saturated air at 158° F.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawing shall be interpreted as illustrative and not in a limiting sense.

I claim:

1. The method of dehydrating alfalfa which comprises passing heated air through a mass of alfalfa for a period of time sufficient to heat alfalfa to a temperature of between approximately 100° F. and 158° F., said air having a specific humidity not more than that of saturated air at 158° F., and thereafter passing a further quantity of heated air through said alfalfa for a period of time sufficient to reduce the moisture content of said alfalfa to a value below approximately 10%, said further quantity of air having a temperature not substantially in excess of 350° F.

2. The method of dehydrating alfalfa which comprises exposing alfalfa to a continuous flow of air heated to a temperature above approximately 180° F. and having a specific humidity not more than that of saturated air at 158° F. for a period of time sufficient to heat alfalfa to a temperature of between approximately 100° F. and 158° F., and thereafter exposing said alfalfa to a continuous flow of heated air having a temperature not substantially in excess of approximately 350° F. for a period of time sufficient to reduce the moisture content of said alfalfa below a value of approximately 10%.

3. The method of dehydrating alfalfa which comprises passing air heated to a temperature of at least approximately 180° F. through a mass of alfalfa for a period of time sufficient to heat alfalfa to a temperature of between approximately 100° F. and 158° F., said air having a specific humidity not more than that of saturated air at 158° F., and thereafter passing heated air directed oppositely to that of said first heated air through said alfalfa for a period of time sufficient to reduce the moisture content of said alfalfa to a value below approximately 10%, the last said heated air having a temperature not substantially in excess of 350° F.

4. The method of dehydrating alfalfa which comprises passing air heated to a temperature of at least approximately 180° F. through a mass of alfalfa for a period of time sufficient to heat alfalfa to a temperature of between approximately 100° F. and 158° F., said air having a specific humidity not more than that of saturated air at 158° F., and thereafter passing a further quantity of heated air in a direction counter to that of the first said heated air through said alfalfa for a period of time sufficient to reduce the moisture content of said alfalfa to a value below approximately 10%, said further quantity of air having a temperature not substantially in excess of 350° F.

5. The method of dehydrating alfalfa which comprises passing heated air through a mass of alfalfa for a period of time sufficient to heat alfalfa to a temperature of between approximately 100° F. and 158° F., said air having a specific humidity not more than that of saturated air at 158° F., and thereafter passing heated air through said alfalfa in a direction opposite to that of said first heated air for a period of time sufficient to a reduce the moisture content of said alfalfa to a value below approximately 10%, the first said heated air being supplied at least in part by reheating a portion of the last said heated air after it has passed through said alfalfa, the last said heated air having an initial temperature not substantially in excess of 350° F.

6. The method of dehydrating alfalfa which comprises moving alfalfa through a first zone in contact with air heated to a temperature in excess of about 180° F. for a time sufficient to heat alfalfa to a temperature of between approximately 100° F. and 158° F., said air having a specific humidity not more than that of saturated air at 158° F., and thereafter moving said alfalfa through a second zone in a series of contiguous oppositely moving passes while in contact with heated air for a time sufficient to reduce the moisture content of said alfalfa to a value below approximately 10%, the first said heated air being supplied at least in part by reheating the effluent air from said second zone, the second said heated air having an initial temperature not substantially in excess of 350° F.

7. The method of dehydrating alfalfa which comprises moving alfalfa through a first zone, passing heated air upwardly through said alfalfa for a period of time sufficient to heat alfalfa to a temperature of approximately 125° F., said heated air having a temperature of approximately 350° F. and a relative humidity of not more than approximately 1.8%, moving said alfalfa through a second zone in a series of contiguous oppositely moving passes, passing heated air downwardly through said alfalfa in the second zone for a time sufficient to reduce the moisture content of said alfalfa to a value of approximately 5% to 7%, the first said heated air being supplied at least in part by reheating approximately one quarter of the effluent air from said second zone, the second said heated air having an initial temperature of approximately 350° F.

AUSIE CALAWAY EAVES.

References Cited in the file of this patent

UNITED STATES PATENTS

| Number | Name | Date |
|---|---|---|
| 616,293 | Davidson | Dec. 20, 1898 |
| 693,387 | Goodwin | Feb. 18, 1902 |
| 936,947 | Roth | Oct. 12, 1909 |
| 1,104,136 | Rich | July 21, 1914 |
| 1,305,599 | Goubert | June 3, 1919 |
| 1,707,929 | Bennett | Apr. 2, 1929 |
| 1,788,099 | Fulmer | Jan. 6, 1931 |
| 2,100,150 | Randolph | Nov. 23, 1937 |
| 2,135,636 | Fulmer | Nov. 8, 1938 |
| 2,323,171 | Wayland | June 29, 1943 |
| 2,350,096 | Chilton | May 30, 1944 |